United States Patent
Xu

(10) Patent No.: US 9,992,635 B2
(45) Date of Patent: Jun. 5, 2018

(54) DEVICE-TO-DEVICE BROADCAST COMMUNICATION METHOD AND USER EQUIPMENT

(71) Applicant: ZTE Corporation, Shenzhen, Guangdong (CN)

(72) Inventor: Hui Xu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days. days.

(21) Appl. No.: 15/116,920

(22) PCT Filed: May 29, 2014

(86) PCT No.: PCT/CN2014/078798
§ 371 (c)(1),
(2) Date: Aug. 5, 2016

(87) PCT Pub. No.: WO2015/117292
PCT Pub. Date: Aug. 13, 2015

(65) Prior Publication Data
US 2017/0142558 A1    May 18, 2017

(30) Foreign Application Priority Data
Feb. 7, 2014    (CN) .......................... 2014 1 0044779

(51) Int. Cl.
*H04W 4/00*   (2018.01)
*H04W 4/06*   (2009.01)
(Continued)

(52) U.S. Cl.
CPC ........... *H04W 4/06* (2013.01); *H04W 72/005* (2013.01); *H04W 76/023* (2013.01)

(58) Field of Classification Search
CPC ........................... H04W 72/14; H04W 76/023
(Continued)

(56) References Cited

U.S. PATENT DOCUMENTS 9,635,684 B2 * 4/2017 Ko .......................... H04L 1/1864
2011/0153773 A1   6/2011 Vandwalle
(Continued)

FOREIGN PATENT DOCUMENTS

CN    103002578 A    3/2013
CN    103037448 A    4/2013
(Continued)

OTHER PUBLICATIONS

International Search Report in international application No. PCT/CN2014/078798, dated Nov. 4, 2014, 5 pgs.
(Continued)

*Primary Examiner* — Iqbal Zaidi
(74) *Attorney, Agent, or Firm* — Cooper Legal Group, LLC

(57) ABSTRACT

Disclosed are a device-to-device broadcast communication method and a user equipment. The method comprises: performing device-to-device (D2D) broadcast communication outside a coverage area of a network in a centralized manner, and broadcasting data on a shared channel via a centre node; alternatively, performing the device-to-device (D2D) broadcast communication outside the coverage area of the network in a distributed manner, and broadcasting data on a shared channel via resource competition.

15 Claims, 4 Drawing Sheets

(51) Int. Cl.
*H04W 76/02* (2009.01)
*H04W 72/00* (2009.01)

(58) Field of Classification Search
USPC .................................................. 370/328–339
See application file for complete search history.

(56) References Cited

U.S. PATENT DOCUMENTS

| | | |
|---|---|---|
| 2011/0153789 A1 | 6/2011 | Vandwalle |
| 2011/0154084 A1 | 6/2011 | Vandwalle |
| 2012/0117400 A1 | 5/2012 | Vandwalle |
| 2014/0059369 A1 | 2/2014 | Vandwalle |
| 2014/0211696 A1 | 7/2014 | Chai et al. |
| 2014/0328310 A1 | 11/2014 | Xu |
| 2015/0189532 A1* | 7/2015 | Dimou ............. H04W 28/021 455/418 |
| 2016/0198511 A1 | 7/2016 | Vandwalle |

FOREIGN PATENT DOCUMENTS

| | | |
|---|---|---|
| CN | 103517371 A | 1/2014 |
| WO | 2013091300 A1 | 6/2013 |

OTHER PUBLICATIONS

English Translation of the Written Opinion of the International Search Authority in international application No. PCT /CN2014/078798, dated Nov. 4, 2014, 8 pgs.

Supplementary European Search Report in European application No. 14881515.2, dated Feb. 2, 2017, 10 pgs.

"Multicast using ProSe UE-to-Network Relays", Jan. 2014, 3GPP Draft; S2-140382 Rev 308 Multicast on UE Network Relays, 3rd Generation Partnership Project (3GPP), Mobile Competence Centre; 650, Route Des Lucioles; F-06921 Sophia-Antipolis Cedex; France, vol. SA WG2, No. Taipei, Taiwan; Retrieved from the Internet: URL:http://www.3gpp.org/ftp/Meetings_3GPP_SYNC/SA/SA2/_Update03/, 4 pgs.

* cited by examiner

UE 1　　　　　Communication network　　　　　UE 2

DEVICE-TO-DEVICE BROADCAST COMMUNICATION METHOD AND USER EQUIPMENT

TECHNICAL FIELD

The disclosure relates to a broadcast communication technology, and in particular to a Device-to-Device (D2D) broadcast communication method and a User Equipment (UE).

BACKGROUND

In a process of implementing the technical solutions of the embodiments of the disclosure, the inventor of the disclosure at least finds that the related art has the technical problems as follows.

D2D communication refers to direct communication between neighbouring devices, such as Bluetooth. Due to lack of network management and control, the D2D communication generally adopts unlicensed spectra such as 2.4 GHz. As smart phones are rapidly popularised, many new applications, such as location-based applications and social networking applications, has emerged. In a mobile communication network, as shown in FIG. 1, due to the fact that a network operator needs to manage and control a licensed spectrum, communications between UEs must be performed via a network even if two devices are located at neighbouring positions. When two communication parties communicate using the licensed spectrum, the network must be adopted so as to achieve the network-based resource scheduling, charging and management for communication activities. In order to reduce load on the network, some companies propose conceptions of direct communication between neighbouring devices. As shown in FIG. 2, a solid line represents a communication path of a user plane, and a dotted line represents a communication path of a control plane. At present, the $3^{rd}$ Generation Partnership Project (3GPP) begins to research the D2D communication. At present, D2D includes two aspects: discovery and communication. The discovery refers to identification of a UE running a D2D application and having a D2D capability in a neighbouring area, and the communication refers to that a D2D UE performs user plane data transmission via inter-user direct connection or via an evolved Node B (eNB).

A public security network provides communication for public service such as public security, fire service and first aid. A public security system needs high robustness and a specific communication requirement for solving emergency service communication. A representative system is a Terrestrial Trunked Radio (TETRA) system defined by the European Telecommunications Standards Institute (ETSI), which can provide a series of functions which were not supported by a commercial cellular system before. Emergency communication also belongs to public security communication.

An application scenario of the D2D technology includes a network coverage scenario (for instance, commercial applications) and a network coverage-free scenario (for instance, public security communication).

Generally, in the network coverage scenario, a network side manages a D2D UE to implement control plane process; in the network coverage-free scenario, a D2D UE implements a control plane process by itself. The D2D technology can be applied to a point-to-point or point-to-multipoint environment such as D2D unicast or broadcast communication.

However, there is not a solution for D2D broadcast communication in a network coverage-free scenario, namely outside a network coverage area, in the related art.

SUMMARY

In view of this, the embodiments of the disclosure are intended to provide a D2D broadcast communication method and a UE, which enable D2D broadcast communication outside a network coverage area to be implemented.

A D2D broadcast communication method may include that:

D2D broadcast communication outside a network coverage area is performed in a centralised manner and data is broadcast on a shared channel via a central node.

In an embodiment, the step that D2D broadcast communication outside the network coverage area is performed in the centralised manner and the data is broadcast on the shared channel via the central node may include that:

when discovering that there is a central node, a source D2D UE sends a broadcast request message to the central node;

the central node sends an acceptance response message when determining that the broadcast request message is accepted, the source D2D UE receives the acceptance response message, and the source D2D UE sends data required to be broadcast to the central node for forwarding on the shared channel; and the central node sends a refusal response message when determining that the broadcast request message is not accepted, and the source D2D UE receives the refusal response message.

In an embodiment, the step that the source D2D UE sends the data required to be broadcast to the central node for forwarding on the shared channel may include that:

after the central node has received the data required to be broadcast and before the data required to be broadcast is forwarded on the shared channel, the central node sends a broadcast notification message; and the central node forwards the data required to be broadcast on the shared channel, and when forwarding of the data required to be broadcast ends, the central node sends a broadcast ending indication message.

In an embodiment, the shared channel may be a pre-set radio resource; and the pre-set radio resource may be radio resource information for D2D broadcast communication, which is locally stored in each D2D UE.

In an embodiment, the pre-set radio resource may include at least one of: a frequency, a frame or sub-frame, a repetition period and a resource index.

In an embodiment, the broadcast request message may include at least one of: a source identifier, a destination identifier, an application identifier, an application server identifier, a group identifier, an indication of whether there is network coverage, a broadcast range and a broadcast time window.

In an embodiment, the central node may be a designated D2D UE;

when there is network coverage, the designated D2D UE may be designated as the central node by a network node; and alternatively, when there is not network coverage, the designated D2D UE may declare itself as the central node and may obtain consent from other D2D UEs.

In an embodiment, bases on which the central node determines that the broadcast request message is accepted may include:

Condition 1: the source D2D UE is allowed to send broadcast data, and

Condition 2: when destination D2D UEs are a group of D2D UEs, the source D2D UE and destination D2D UEs fall within a same group, if Condition 1 and Condition 2 are both satisfied, the central node determines that the broadcast request message is accepted, and otherwise, a request is refused.

In an embodiment, the method may further include that: when two or more source D2D UEs simultaneously send broadcast request messages, the central node sorts the received broadcast request messages.

In an embodiment, bases on which the central node sorts the received broadcast request messages may include at least one of: a chronological order in which the broadcast request messages are received, priorities of the source D2D UEs sending the broadcast request messages and a local policy of the central node.

A D2D broadcast communication method may include that:

D2D broadcast communication outside a network coverage area is performed in a centralised manner and a destination D2D UE receives data broadcast on a shared channel via a central node.

In an embodiment, the step that D2D broadcast communication outside the network coverage area is performed in the centralised manner and the destination D2D UE receives the data broadcast on the shared channel via the central node may include that:

a broadcast notification message is listened to, the destination D2D UE receives the data broadcast on the shared channel.

A UE may include:

a first processing unit configured to perform D2D broadcast communication outside a network coverage area in a centralised manner and broadcast data on a shared channel via a central node.

In an embodiment, the first processing unit may include:

a first sending sub-unit configured to, when the source D2D UE discovers that there is a central node, send a broadcast request message to the central node;

a second sending sub-unit configured to send an acceptance response message when the central node determines that the broadcast request message is accepted, forward data required to be broadcast on the shared channel, and send a refusal response message when the central node determines that the broadcast request message is not accepted; and a first receiving sub-unit configured to receive the acceptance response message or receive the refusal response message.

In an embodiment, the second sending sub-unit may be further configured to: after the central node has received the data required to be broadcast and before the data required to be broadcast is forwarded on the shared channel, send a broadcast notification message; and forward the data required to be broadcast on the shared channel, and when forwarding of the data required to be broadcast ends, send a broadcast ending indication message.

In an embodiment, the first processing unit may further include:

a sorting sub-unit configured to, when two or more source D2D UEs simultaneously send broadcast request messages, sort the received broadcast request messages.

The first processing unit, the first sending sub-unit, the second sending sub-unit, the first receiving sub-unit and the sorting sub-unit may be implemented by a Central Processing Unit (CPU), a Digital Signal Processor (DSP) or a Field-Programmable Gate Array (FPGA) when executing processing.

A UE may include:

a second processing unit configured to perform D2D broadcast communication outside a network coverage area in a centralised manner and receive data broadcast on a shared channel via a central node.

In an embodiment, the second processing unit may include:

a first listening sub-unit configured to listen to a broadcast notification message; and a second receiving sub-unit configured to receive the data broadcast on the shared channel.

The second processing unit, the first listening sub-unit and the second receiving sub-unit may be implemented by a CPU, a DSP or an FPGA when executing processing.

A D2D broadcast communication method may include that:

D2D broadcast communication outside a network coverage area is performed in a distributed manner and data is broadcast on a shared channel via resource competition.

In an embodiment, the step that D2D broadcast communication outside the network coverage area is performed in the distributed manner and the data is broadcast on the shared channel via resource competition may include that:

when discovering that there is not a central node, a source D2D UE sends a broadcast request message;

when determining that a broadcast request is successful, the source D2D UE sends data required to be broadcast on the shared channel; and when determining that the broadcast request is unsuccessful, the source D2D UE waits for a designated period of time and then re-sends a broadcast request message.

In an embodiment, the step that the source D2D UE sends the data required to be broadcast on the shared channel may include that:

before sending the data required to be broadcast on the shared channel, the source D2D UE sends a broadcast notification message; and the source D2D UE sends the data required to be broadcast on the shared channel, and after sending of the data required to be broadcast ends, the source D2D UE sends a broadcast ending indication message.

In an embodiment, the shared channel may be a pre-set radio resource; and the pre-set radio resource may be radio resource information for D2D broadcast communication, which is locally stored in each D2D UE.

In an embodiment, the pre-set radio resource may include at least one of: a frequency, a frame or sub-frame, a repetition period and a resource index.

In an embodiment, the broadcast request message may include at least one of: a source identifier, a destination identifier, an application identifier, an application server identifier, a group identifier, an indication of whether there is network coverage, a broadcast range and a broadcast time window.

In an embodiment, bases on which the source D2D UE determines that the broadcast request is successful may include that:

an acceptance response message sent by at least one destination D2D UE is received within the designated period of time; and if the acceptance response message is received, the broadcast request is successful, and otherwise, the broadcast request is unsuccessful.

In an embodiment, the method may further include that: when two or more source D2D UEs simultaneously send broadcast request messages, the messages conflict, so the request from only one or no source D2D UE is successful in a resource competition manner.

A D2D broadcast communication method may include that:

D2D broadcast communication outside a network coverage area is performed in a distributed manner and a destination D2D UE receives data broadcast on a shared channel via resource competition.

In an embodiment, the step that D2D broadcast communication outside the network coverage area is performed in the distributed manner and the destination D2D UE receives the data broadcast on the shared channel via resource competition may include that:

the destination D2D UE listens to a broadcast request message, the destination D2D UE sends an acceptance response message to a source D2D UE, the acceptance response message being configured to indicate that the destination D2D UE accepts a broadcast request from the source D2D UE; and the desitination D2D UE listens to a broadcast notification message, the destination D2D UE receives the data broadcast on the shared channel.

A UE may include:

a third processing unit configured to perform D2D broadcast communication outside a network coverage area in a distributed manner and broadcast data on a shared channel via resource competition.

In an embodiment, the third processing unit may include:

a third sending sub-unit configured to: when a source D2D UE discovers that there is not a central node, send a broadcast request message; when the source D2D UE determines that a broadcast request is successful, send data required to be broadcast on the shared channel; and when the source D2D UE determines that the broadcast request is unsuccessful, wait for a designated period of time and then re-send the broadcast request message.

In an embodiment, the third sending sub-unit may be further configured to: send, before the source D2D UE sends the data required to be broadcast on the shared channel, a broadcast notification message; and send the data required to be broadcast on the shared channel, and after sending of the data required to be broadcast ends, send a broadcast ending indication message.

In an embodiment, the third processing unit may further include:

a third receiving sub-unit configured to receive an acceptance response message sent by a destination D2D UE, herein if the acceptance response message sent by at least one destination D2D UE is received within the designated period of time, it is represented that a broadcast request is successful and the third sending sub-unit is notified, and if the acceptance response message sent by at least one destination D2D UE is not received within the designated period of time, it is represented that the broadcast request is unsuccessful and the third sending sub-unit is notified.

In an embodiment, the third sending sub-unit may be further configured to determine whether to send data by making the request from only one or no source D2D UE succeed in a resource competition manner when two or more source D2D UEs simultaneously send broadcast request messages and the messages conflict.

The third processing unit, the third sending sub-unit and the third receiving sub-unit may be implemented by a CPU, a DSP or an FPGA when executing processing.

A UE may include:

a fourth processing unit configured to perform D2D broadcast communication outside a network coverage area in a distributed manner and receive data broadcast on a shared channel via resource competition.

In an embodiment, the fourth processing unit may include:

a second listening sub-unit configured to listen to a broadcast request message;

a fourth sending sub-unit configured to send an acceptance response message to a source D2D UE, the acceptance response message being configured to indicate that the destination D2D UE accepts a broadcast request from the source D2D UE;

a third listening sub-unit configured to listen to a broadcast notification message; and a fourth receiving sub-unit configured to receive the data broadcast on the shared channel.

The fourth processing unit, the second listening sub-unit, the fourth sending sub-unit, the third listening sub-unit and the fourth receiving sub-unit may be implemented by a CPU, a DSP or an FPGA when executing processing.

By means of the embodiments of the disclosure, D2D broadcast communication outside a network coverage area is performed in a centralised manner and data is broadcast on a shared channel via a central node; or, D2D broadcast communication outside a network coverage area is performed in a distributed manner and data is broadcast on a shared channel via resource competition. The embodiments of the disclosure enable D2D broadcast communication outside a network coverage area to be implemented.

DETAILED DESCRIPTION

The implementation of the technical solution will be further described below with reference to the drawings in detail.

The solutions in the embodiments of the disclosure aim at the problems of implementation of D2D broadcast communication such as the problem how to implement D2D broadcast communication outside a network coverage area, the problem how to allocate radio resources for D2D broadcast and the problem how a D2D UE acquires broadcast resources, are used to solve the problem of implementation of D2D broadcast, and can implement D2D broadcast communication outside the network coverage area.

In the embodiments of the disclosure, D2D broadcast communication outside a network coverage area adopts a centralised or distributed method. Herein centralised D2D broadcast communication is performed via a central node; and distributed D2D broadcast communication is performed on a shared channel in a resource competition manner. By means of the embodiments of the disclosure, D2D broadcast communication outside the network coverage area can be implemented. By means of the above settings, public security communication can be implemented, and dependency of D2D communication on a network is reduced.

1. In a centralised manner, from a perspective of a source D2D UE side, a D2D broadcast communication method according to an embodiment of the disclosure includes that: D2D broadcast communication outside a network coverage area is performed in a centralised manner and data is broadcast on a shared channel via a central node.

Correspondingly, from a perspective of a destination D2D UE side, a D2D broadcast communication method according to an embodiment of the disclosure includes that: D2D broadcast communication outside a network coverage area is performed in a centralised manner and a destination D2D UE receives data broadcast on a shared channel via a central node.

2. In a distributed manner, from a perspective of a source D2D UE side, a D2D broadcast communication method according to an embodiment of the disclosure includes that: D2D broadcast communication outside a network coverage area is performed in a distributed manner and data is broadcast on a shared channel via resource competition.

Correspondingly, from a perspective of a destination D2D UE side, a D2D broadcast communication method according to an embodiment of the disclosure includes that: D2D broadcast communication outside a network coverage area is performed in a distributed manner and a destination D2D UE receives data broadcast on a shared channel via resource competition.

Method embodiment 1: a centralised and distributed combination scenario.

Figure 1:
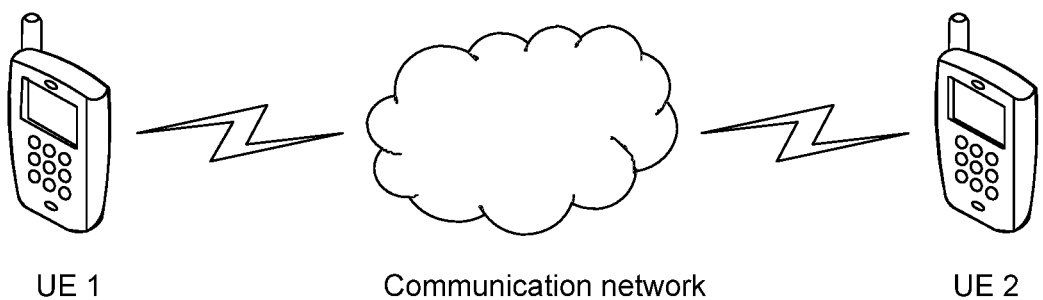
FIG. 1 is a diagram of existing network communication.
Figure 2:
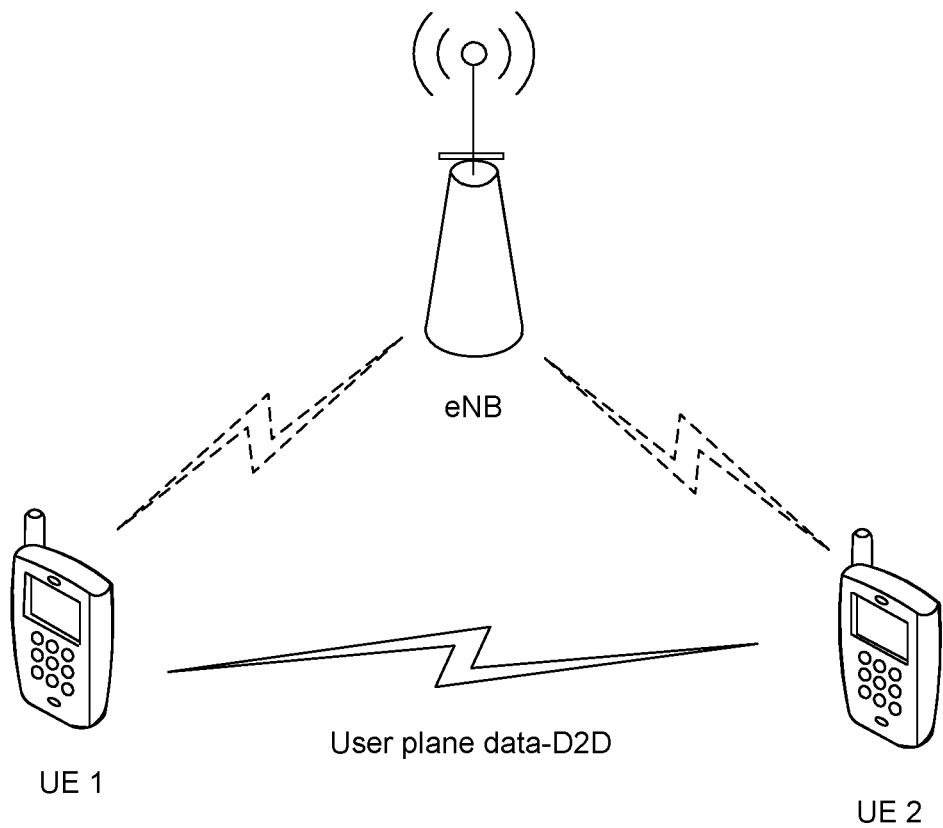
FIG. 2 is a diagram of existing D2D communication.
Figure 3:
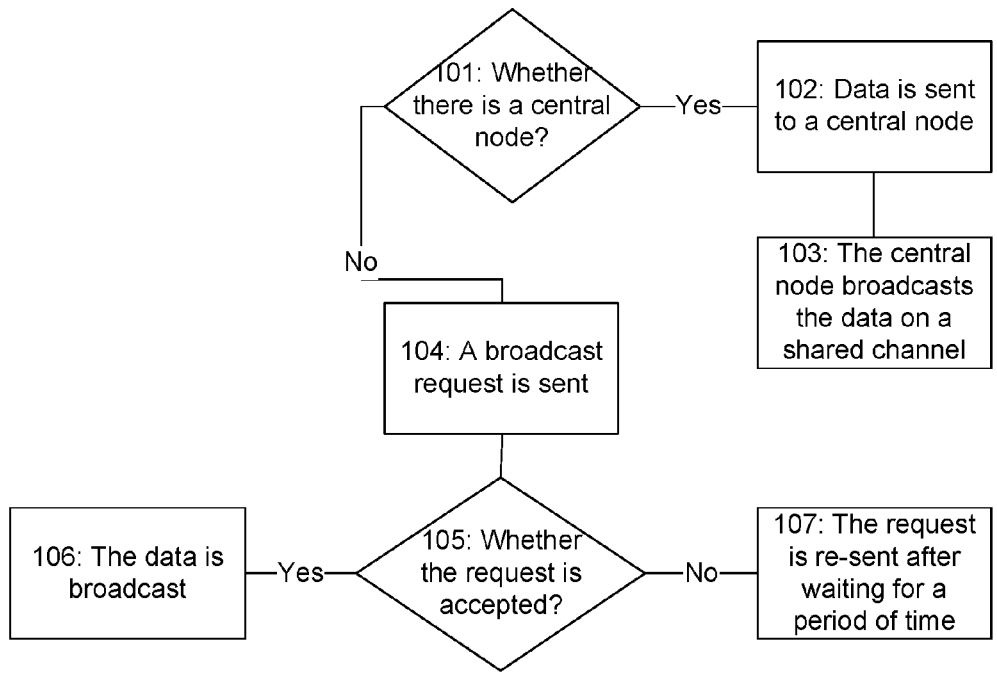
FIG. 3 is a flowchart of a method embodiment 1 of the disclosure.

As shown in FIG. 3, a D2D broadcast implementation method according to an embodiment of the disclosure includes the steps as follows.

Step 101: A D2D UE determines whether there is a central node, if Yes, Step 102 is executed, and otherwise, Step 104 is executed.

The D2D UE is a D2D UE which is ready to send broadcast data, or may be called a source D2D UE; and the central node is a specific D2D UE, which may become the central node by means of the following two methods: 1. when there is network coverage, the D2D UE is designated as the central node by a network node; and 2. in a network coverage-free scenario, the D2D UE declares itself as the central node and obtains consent from other D2D nodes. After the central node is determined in either manner, it is necessary to notify other D2D UEs in a neighbour area. Functions of the central node include: authenticating a source D2D UE, accepting or refusing a broadcast request from the source D2D UE, receiving data sent by the source D2D UE, broadcasting the data on a shared channel, sorting broadcast requests of a plurality of source D2D UEs, interacting with a network side (in the case of network coverage) to update shared channel information and the like.

It is important to note that by the D2D UEs being located outside a network coverage area, it means all neighbour D2D UEs are located outside the network coverage area or part of D2D UEs are located outside the network coverage area.

The neighbour D2D UEs are D2D UEs in a neighbour area, herein the neighbour area is an area meeting a pre-set rule, in which a D2D UE can be discovered. There may be one or more neighbour devices, herein a plurality of neighbour devices fall within a common group generally, and a neighbour device is, generally, a device on which an application (such as a social networking application, a game application, an entertainment application and a shopping application), identical to that running on a D2D UE initiating a request, is running, or a device whose user is in friend relationship with a user for the D2D UE initiating the request.

The D2D UE refers to a UE having D2D discovery and communication capabilities and having subscribed for using D2D functions.

Step 102: the D2D UE sends data to the central node.

The D2D UE sends a broadcast request message to the central node on a pre-set radio resource, if a plurality of D2D UEs simultaneously sends requests to the central node, the central node sorts the received requests, and bases on which the received requests are sorted may be a chronological order in which the broadcast request messages are received, priorities of the D2D UEs sending the requests, a local policy of the central node and the like.

Step 103: the central node broadcasts the data on the shared channel. A centralised broadcast flow ends.

The central node receives data sent by the source D2D UE, the data being data required to be broadcast. The shared channel is a pre-designated radio resource such as a resource configured by an eNB in the case of network coverage or a resource configured by Operation And Maintenance (OAM), and resource information about the shared channel needs to be saved in each D2D UE locally and is necessarily updated only in the case of network coverage.

Before the central node broadcasts the data, the central node needs to send a broadcast notification message which indicates information such as a broadcast time, the size of the data and an area where the data to be broadcast. The broadcast notification message is sent on a pre-set radio resource. The radio resource adopts an uplink resource (UE to eNB), and may be special or general. Radio resource information includes at least one of: a frequency, a frame or sub-frame, a repetition period (configured to indicate a time interval where a D2D UE sends/listens to notice information on a radio resource) and a resource index (configured to indicate a radio resource for different D2D discovery requirements such as point-to-point, point-to-multipoint and different inter-device distances).

A destination D2D UE listens to the broadcast notification message and receives the data broadcast on the shared channel.

When sending of the broadcast data of the central node ends, the central node sends a broadcast ending indication message.

Step 104: the D2D UE sends a broadcast request message.

If the D2D UE does not discover the central node, the D2D UE sends the broadcast request message on the pre-set radio resource.

The broadcast request message includes at least one of: a source identifier (configured to indicate a D2D UE sending a request), a destination identifier (configured to indicate a destination device expected to be discovered, the destination identifier being a specific multicast address, a group identifier, a group Radio Network Temporary Identifier (RNTI) and the like for broadcast communication), an application identifier, an application server identifier, a group identifier, an indication of whether there is network coverage, a broadcast range (configured to indicate a broadcast area) and a broadcast time window (configured to indicate effective broadcast time).

Step 105: the D2D UE determines whether the request is successful, if Yes, Step 106 is executed, and otherwise, Step 107 is executed.

The D2D UE determines whether the request is successful in the following manner: receiving an acceptance response message of at least one destination D2D UE within specified time. If any response message is not received within the specified time, it is determined that the request is unsuccessful. When two or more source D2D UEs simultaneously send broadcast request messages, the messages conflict, then the request from only one or no D2D UE is successful via resource competition.

The destination D2D UE listens on the pre-set radio resource, and if a D2D broadcast request message is heard, a response message is sent to the source D2D UE via the radio resource, the response message being configured to indicate that the destination D2D UE accepts a request, and being sent via a Radio Resource Control (RRC) signalling.

Step 106: the D2D UE broadcasts data on a shared channel.

When the D2D UE determines that a broadcast request is successful, the D2D UE broadcasts the data on the pre-set shared channel. Before broadcasting the data, the D2D UE needs to send a broadcast notification message on the pre-set channel.

The destination D2D UE listens on the pre-set radio resource, and if a D2D broadcast request message is heard, D2D broadcast data is further received on the shared channel.

If sending of the broadcast data via the D2D UE ends, a broadcast ending indication message is sent.

Step 107: the D2D UE waits for a period of time and then re-sends the broadcast request message.

When a broadcast request is determined to be unsuccessful, the D2D UE waits for a period of time and then re-sends a broadcast request message. Herein the period of time may be a random length or a waiting time value pre-stored locally. The D2D UE may send the same broadcast request message for many times, and the specific number of times of sending may be determined according to a locally pre-stored numerical value or a broadcast data time window.

Method embodiment 2: a centralised scenario.

Figure 4:
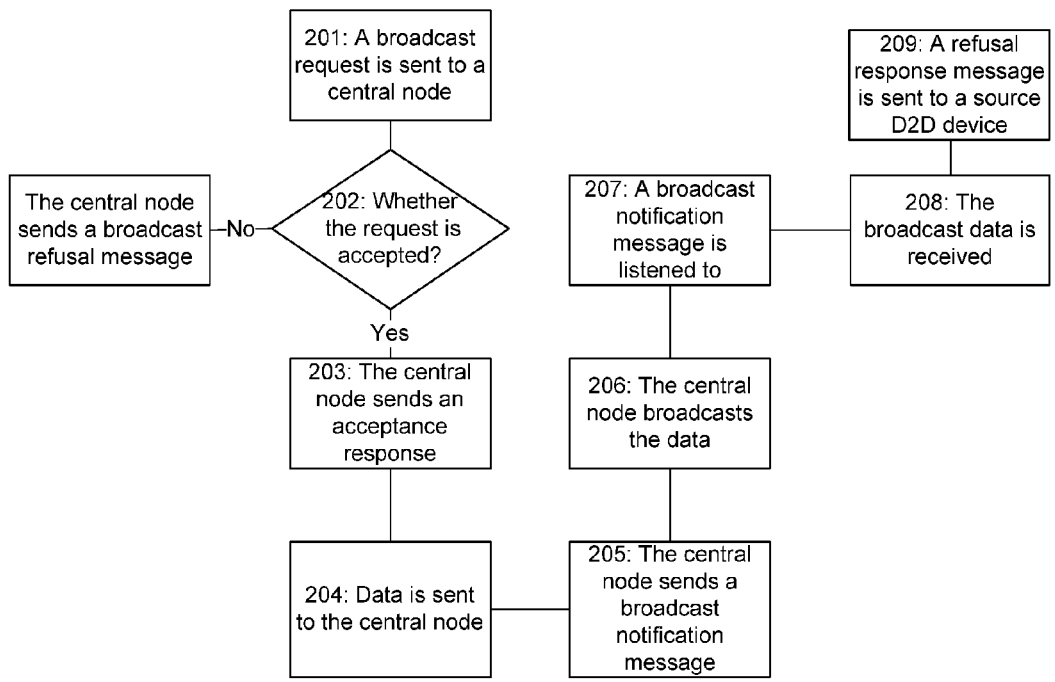
FIG. 4 is a flowchart of a method embodiment 2 of the disclosure.

As shown in FIG. 4, a method for centralised D2D broadcast with a central node includes the steps as follows.

Step 201: a source D2D UE sends a broadcast request message to a central node.

The broadcast request message is a control plane signalling, the request message including at least one of: a source identifier (configured to indicate a D2D UE sending a request), a destination identifier (configured to indicate a destination device expected to be discovered, the destination identifier being a specific multicast address, a group identifier, a group RNTI and the like for broadcast communication), an application identifier, an application server identifier, a group identifier, an indication of whether network there is network coverage, a broadcast range (configured to indicate a broadcast area) and a broadcast time window (configured to indicate effective broadcast time).

Step 202: the central node determines whether to accept a broadcast request, if Yes, Step 203 is executed, and otherwise, Step 209 is executed.

The central node determines whether to accept the request according to the following conditions: 1. the source D2D UE is allowed to send broadcast data; and 2. when destination D2D UEs are a group of D2D UEs, the source D2D UE and the destination D2D UEs fall within a same group. When the above conditions are both satisfied, the request can be accepted, and otherwise, the request is refused.

If two or more source D2D UEs simultaneously send broadcast requests, the central node sorts the received requests, and bases on which the received requests are sorted include one or more of: a chronological order in which the broadcast request messages are received, priorities of the source D2D UEs sending the requests, a local policy of the central node and the like.

Step 203: the central node sends an acceptance response message to the source D2D UE.

The central node determines to accept a broadcast request of the D2D UE, the central node sends an acceptance response message to the source D2D UE via a control plane signalling, and the response message is sent within a time window designated by a discovery request message. If it is necessary for the source D2D UE to queue and wait, the central node sends a waiting indication message, including waiting time and the like.

Step 204: the source D2D UE sends data to the central node.

The source D2D UE sends data to the central node and transmits the data via a user plane. If it is necessary to wait, the data is sent after the indicated waiting time.

Step 205: the central node sends a broadcast data notification message.

After receiving the data, the central node sends a broadcast data notification message on a pre-set resource, the broadcast data notification message being configured to indicate: information such as sending time of broadcast data, the size of the broadcast data and a sending area.

The notification message is transmitted via an RRC signalling.

Step 206: the central node broadcasts data on a shared channel.

The central node sends the received data on the shared channel.

Step 207: the destination D2D UE listens to a broadcast notification message.

The destination D2D UE listens to a D2D broadcast notification message on a pre-set radio resource according to a notification period.

Step 208: a destination D2D UE hearing the broadcast notification message receives data broadcast on the shared channel.

If the destination D2D UE hears the broadcast notification message, the destination D2D UE further receives the data broadcast on the shared channel.

Step 209: the central node sends a refusal response message to the source D2D UE.

If the central node determines that a D2D UE broadcast request is not supported, a refusal message is sent to the source D2D UE, and meanwhile, refusal reasons, for instance, that the source D2D UE is not allowed to send the broadcast data or the source D2D UE and the destination D2D UE do not fall within the same group are pointed out.

The refusal message is transmitted via a control signalling. If an accepting or refusal response message is not received within a discovery time window, the source D2D UE determines that a request is unsuccessful.

After the requests is unsuccessful, the source D2D UE selects request message re-sending or cancels request sending according to failure reasons. The request needs to be re-sent after waiting for a period of random time.

Embodiment 3: a distributed combination scenario.

Figure 5:
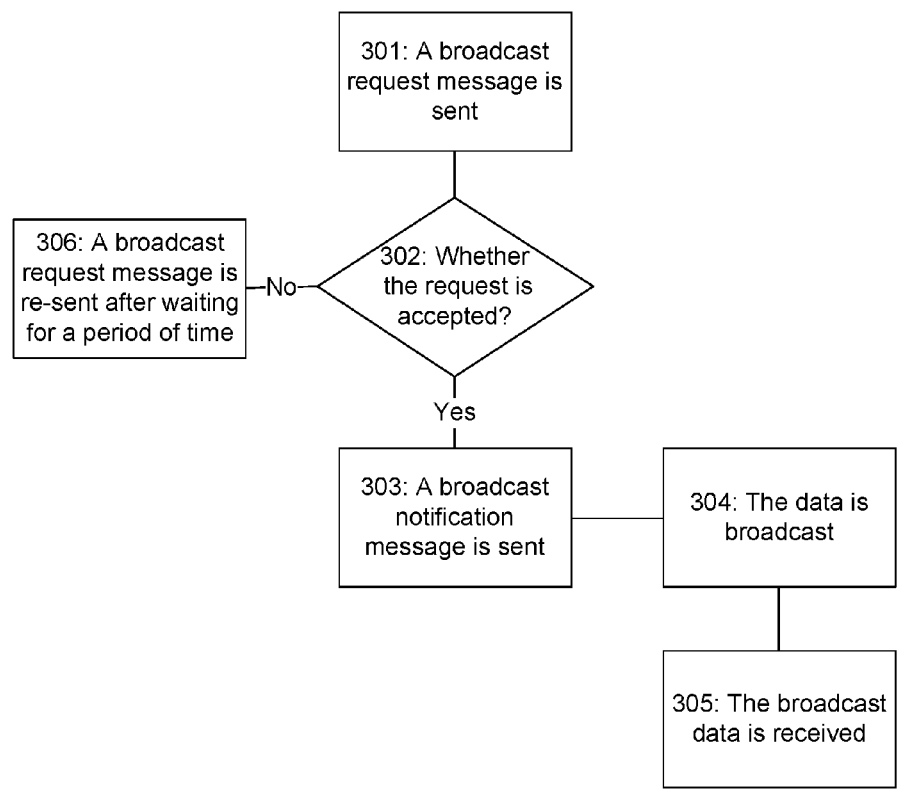
FIG. 5 is a flowchart of a method embodiment 3 of the disclosure.

As shown in FIG. 5, an implementation method for a distributed D2D broadcast scenario without a central node includes the steps as follows.

Step 301: a source D2D UE sends a D2D broadcast request message on a pre-configured radio resource.

The pre-configured radio resource refers to information which has been stored on a D2D UE before being discovered. The pre-configuration may be configuration via a network side eNB when the D2D UE is in network coverage or pre-configuration via a D2D UE manufacturer. Pre-configured radio resource information includes at least one of: a frequency, a frame or sub-frame, a repetition period (configured to indicate a time interval where a D2D UE sends/listens to notice information on a radio resource) and a resource index (configured to indicate a radio resource for different D2D discovery requirements such as point-to-point, point-to-multipoint and different inter-device distances).

The broadcast request message is a control plane signalling and is sent via an RRC signalling. The request message includes at least one of: a source identifier (configured to indicate a D2D UE sending a request), a destination identifier (configured to indicate a destination device expected to be discovered, the destination identifier being a specific multicast address, a group identifier, a G-RNTI and the like for broadcast communication), an application identifier, an application server identifier, a group identifier, an indication of whether there is network coverage, a broadcast range (configured to indicate a broadcast area) and a broadcast time window (configured to indicate effective broadcast time), herein the G-RNTI is short for a Group-Radio Network Temporary Identifier, which refers to a group radio network temporary identifier.

Step 302: the source D2D UE determines whether a broadcast request is successful, if Yes, Step 303 is executed, and otherwise, Step 306 is executed.

The D2D UE determines whether the request is successful in the following manner: receiving an acceptance response message of at least one destination D2D UE within specified time. If any response message is not received within the specified time, it is determined that the request is unsuccessful. When two or more source D2D UEs simultaneously send broadcast request messages, the messages conflict, then the request from only one or no D2D UE is successful.

The destination D2D UE listens on the pre-set radio resource, and if a D2D broadcast request message is heard, a response message is sent to the source D2D UE via the radio resource, the response message being configured to indicate that the destination D2D UE accepts a request, and being sent via an RRC signalling.

Step 303: the source D2D UE sends a broadcast notification message.

If the source D2D UE determines that the broadcast request is successful, a broadcast notification message configured to indicate information such as the time, size and area of broadcast data, is sent on the pre-set radio resource. The broadcast notification message may be sent for many times before the broadcast data is sent.

The destination D2D UE listens to the broadcast notification message on the pre-set radio resource.

Step 304: the source D2D UE sends the broadcast data on a shared channel.

The source D2D UE sends the broadcast data on a pre-set shared channel.

Step 305: a D2D UE hearing the broadcast notification message receives the data broadcast on the shared channel.

The D2D UE hears a broadcast data notification message, and then receives the broadcast data on the pre-set shared channel.

Step 306: the source D2D UE waits for a period of time and then re-sends a broadcast request message.

When determining that the broadcast request is unsuccessful, the source D2D UE waits for a period of time and then re-sends a broadcast request message. The D2D UE may send the same broadcast request message for many times, and the specific number of times of sending may be determined according to a locally pre-stored numerical value or a broadcast data time window.

UE embodiment:

In order to implement the above D2D broadcast communication method, an embodiment of the disclosure also provides a UE, which is configured to: select a D2D broadcast sending manner (the broadcast sending manner is centralised and/or distributed), send a D2D broadcast request message, send a D2D broadcast notification message, listen to the D2D broadcast notification message, receive a request response message, send/forward D2D broadcast data and receive D2D broadcast data; and store pre-set radio resource information for D2D broadcast.

Figure 6:
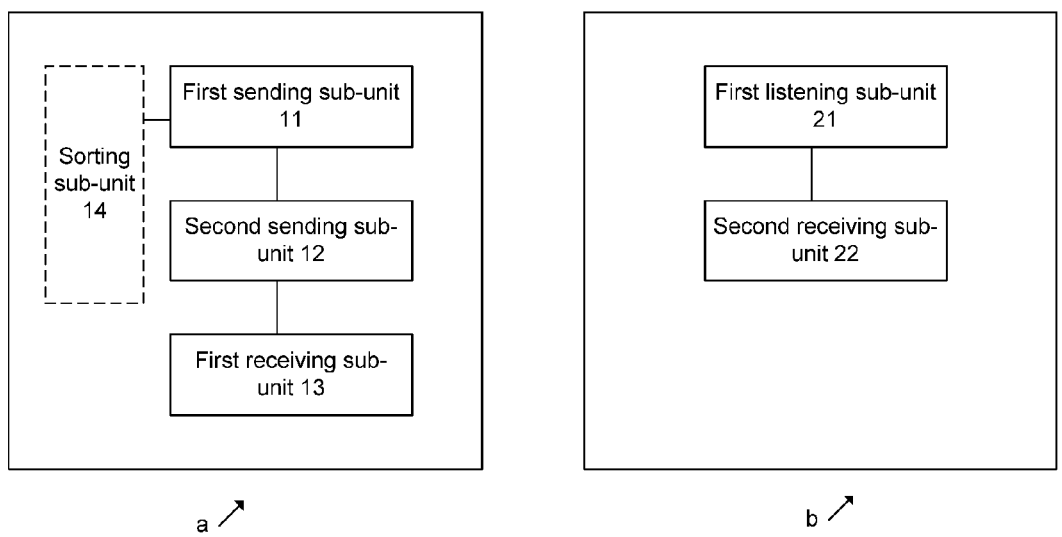
FIG. 6 is a structural diagram of a UE according to an embodiment of the disclosure.

Specifically speaking, as shown in FIG. 6, a in FIG. 6 indicates a centralised UE structural diagram from a perspective of a source D2D UE side. The UE includes: a first sending sub-unit 11 configured to, when a source D2D UE discovers that there is a central node, send a broadcast request message to the central node; a second sending sub-unit 12 configured to send an acceptance response message when the central node determines that the broadcast request message is accepted, forward data required to be broadcast on a shared channel, and send a refusal response message when the central node determines that the broadcast request message is not accepted; a first receiving sub-unit 13 configured to receive the acceptance response message or receive the refusal response message; and a sorting sub-unit 14 configured to, when two or more source D2D UEs simultaneously send broadcast request messages, sort the received broadcast request messages.

b in FIG. 6 indicates a centralised UE structural diagram from a perspective of a destination D2D UE side. The UE includes: a first listening sub-unit 21 configured to listen to a broadcast notification message; and a second receiving sub-unit 22 configured to receive broadcast data on a shared channel.

Figure 7:
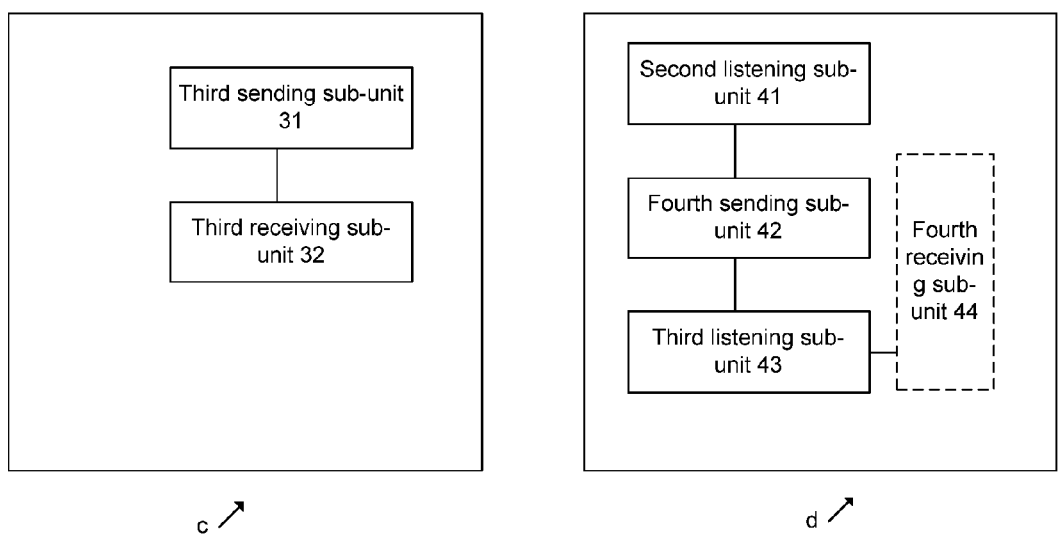
FIG. 7 is a structural diagram of a UE according to an embodiment of the disclosure.

Specifically speaking, as shown in FIG. 7, c in FIG. 7 indicates a distributed UE structural diagram from a perspective of a source D2D UE side. The UE includes: a third sending sub-unit 31 configured to: when a source D2D UE discovers that there is not a central node, send a broadcast request message; when the source D2D UE determines that a broadcast request is successful, send data required to be broadcast on a shared channel; and when the source D2D UE determines that the broadcast request is unsuccessful, wait for a designated period of time and then re-send the broadcast request message; a third receiving sub-unit 32 configured to receive an acceptance response message sent by a destination D2D UE, herein if the acceptance response message sent by at least one destination D2D UE is received within the designated period of time, it is represented that a broadcast request is successful and the third sending sub-unit is notified, and if the acceptance response message sent by at least one destination D2D UE is not received within the designated period of time, it is represented that the broadcast request is unsuccessful and the third sending sub-unit is notified.

FIG. 7 indicates a distributed UE structural diagram from a perspective of a destination D2D UE side. The UE includes: a second listening sub-unit 41 configured to listen to a broadcast request message; a fourth sending sub-unit 42 configured to send an acceptance response message to a source D2D UE, the acceptance response message being configured to indicate that the destination D2D UE accepts a broadcast request from the source D2D UE; a third listening sub-unit 43 configured to listen to a broadcast notification message; and a fourth receiving sub-unit 44 configured to receive broadcast data on a shared channel.

Here, it is important to note that UEs shown in FIG. 6 and FIG. 7 further include storage sub-units configured to store pre-set radio resource information for D2D broadcast, which is not reflected in the figures.

If an integrated module in the embodiments of the disclosure is implemented in a form of a software function module and is sold or used as an independent product, the product can also be stored in a computer readable storage medium. Based on this understanding, the technical solutions of the embodiments of the disclosure can be substantially embodied in a form of a software product or parts contributing to the conventional art can be embodied in a form of a software product, and the computer software product is stored in a storage medium, including a plurality of instructions enabling a computer device which may be a personal computer, a server or a network device to execute all or part of the method according to each embodiment of the disclosure. The storage medium includes: various media capable of storing program codes, such as a U disk, a mobile hard disk, a Read-Only Memory (ROM), a Random Access Memory (RAM), a magnetic disk or an optical disk. Thus, the embodiments of the disclosure are not limited to combination of any specific hardware and software.

Correspondingly, an embodiment of the disclosure also provides a computer storage medium. A computer program is stored therein and is configured to execute the D2D broadcast communication method according to the embodiment of the disclosure.

The above is only the preferred embodiments of the disclosure and is not intended to limit the protective scope of the disclosure.

INDUSTRIAL APPLICABILITY

By means of the embodiments of the disclosure, D2D broadcast communication outside a network coverage area is performed in a centralised manner and data is broadcast on a shared channel via a central node; and alternatively, D2D broadcast communication outside a network coverage area is performed in a distributed manner and data is broadcast on a shared channel via resource competition. The embodiments of the disclosure enable D2D broadcast communication outside a network coverage area to be implemented.

What is claimed is:

1. A Device-to-Device (D2D) broadcast communication method, comprising:
performing D2D broadcast communication outside a network coverage area in a centralised manner and broadcasting data on a shared channel via a central node between a source D2D User Equipment (UE) and a destination D2D UE,
wherein performing D2D broadcast communication outside the network coverage area in the centralised manner and broadcasting the data on the shared channel via the central node comprises:
when the source D2D UE discovers that the central node exists between the source D2D UE and the destination D2D UE, sending, by the source D2D UE, a broadcast request message to the central node;
when the central node determines that the broadcast request message is accepted, sending an acceptance response message, receiving, by the source D2D UE, the acceptance response message, and sending, by the source D2D UE, data required to be broadcast to the central node for forwarding on the shared channel; and
when the central node determines that the broadcast request message is not accepted, sending a refusal response message, and receiving, by the source D2D UE, the refusal response message,
wherein sending, by the source D2D UE, the data required to be broadcast to the central node for forwarding on the shared channel comprises:
after the central node has received the data required to be broadcast and before the data required to be broadcast is forwarded on the shared channel, sending, by the central node, a broadcast notification message; and
forwarding, by the central node, the data required to be broadcast on the shared channel, and when forwarding of the data required to be broadcast ends, sending, by the central node, a broadcast ending indication message.

2. The method according to claim 1, wherein the shared channel is a pre-set radio resource; and
the pre-set radio resource is radio resource information for D2D broadcast communication, which is locally stored in each D2D UE.

3. The method according to claim 2, wherein the pre-set radio resource comprises at least one of: a frequency, a frame or sub-frame, a repetition period or a resource index.

4. The method according to claim 1, wherein the broadcast request message comprises at least one of: a source identifier, a destination identifier, an application identifier, an application server identifier, a group identifier, an indication of whether a network coverage that covers all of the source D2D UE, the central node, and the destination D2D UE exists, a broadcast range or a broadcast time window.

5. The method according to claim 1, wherein the central node is a designated D2D UE;
when a network coverage that covers all of the source D2D UE, the central node, and the destination D2D UE exists, the designated D2D UE is designated as the central node by a network node; or
when a network coverage that covers all of the source D2D UE, the central node, and the destination D2D UE does not exist, the designated D2D UE declares the designated D2D UE as the central node and obtains consent from other D2D UEs.

6. The method according to claim 1, wherein bases on which a basis for the central node determines that the broadcast request message is accepted comprise:
a first condition being a condition that the source D2D UE is allowed to send broadcast data, and
a second condition being a condition that when destination D2D UEs are a group of D2D UEs, the source D2D UE and the destination D2D UEs fall within a same group,
if the first condition and the second condition are both satisfied, the central node determines that the broadcast request message is accepted, and otherwise, the request is refused.

7. The method according to claim 1, further comprising:
when two or more source D2D UEs simultaneously send broadcast request messages to the central node, sorting, by the central node, the received broadcast request messages.

8. The method according to claim 7, wherein bases on which the central node sorts the received broadcast request messages comprise at least one of: a chronological order in which the broadcast request messages are received, priorities of the source D2D UEs sending the broadcast request messages or a local policy of the central node.

9. A Device-to-Device (D2D) broadcast communication method, comprising:
  performing D2D broadcast communication outside a network coverage area in a centralised manner and receiving, by a destination D2D User Equipment (UE), data broadcast on a shared channel via a central node between a source D2D UE and the destination D2D UE,
  wherein broadcasting the data on the shared channel via the central node comprises:
    receiving, by the central node, a broadcast request message from the source D2D UE;
    when the central node determines that the broadcast request message is accepted, sending an acceptance response message to the source D2D UE; receiving, by the central node, data required to be broadcast and forwarding the data on the shared channel; and
    when the central node determines that the broadcast request message is not accepted, sending a refusal response message,
  wherein performing D2D broadcast communication outside the network coverage area in the centralised manner and receiving, by the destination D2D UE, the data broadcast on the shared channel via the central node comprises:
    listening, by the destination D2D UE, to a broadcast notification message, and receiving, by the destination D2D UE, the data broadcast on the shared channel.

10. A Device-to-Device (D2D) broadcast communication method, comprising:
  performing D2D broadcast communication outside a network coverage area in a distributed manner and broadcasting data on a shared channel via resource competition,
  wherein performing D2D broadcast communication outside the network coverage area in the distributed manner and broadcasting the data on the shared channel via resource competition comprises:
    when a source D2D User Equipment (UE) discovers that a central node does not exist between the source D2D UE and a destination D2D UE, sending, by the source D2D UE, a broadcast request message;
    when the source D2D UE determines that a broadcast request is successful, sending, by the source D2D UE, data required to be broadcast on the shared channel; and
    when the source D2D UE determines that the broadcast request is unsuccessful, waiting for a designated period of time and then re-sending the broadcast request message,
  wherein sending, by the source D2D UE, the data required to be broadcast on the shared channel comprises:
    before the source D2D UE sends the data required to be broadcast on the shared channel, sending a broadcast notification message; and
    sending, by the source D2D UE, the data required to be broadcast on the shared channel, and after sending of the data required to be broadcast ends, sending, by the source D2D UE, a broadcast ending indication message.

11. The method according to claim 10, wherein the shared channel is a pre-set radio resource; and
  the pre-set radio resource is radio resource information for D2D broadcast communication, which is locally stored in each D2D UE.

12. The method according to claim 11, wherein the pre-set radio resource comprises at least one of: a frequency, a frame or sub-frame, a repetition period or a resource index.

13. The method according to claim 10, wherein the broadcast request message comprises at least one of: a source identifier, a destination identifier, an application identifier, an application server identifier, a group identifier, an indication of whether a network coverage that covers all of the source D2D UE, the central node, and the destination D2D UE exists, a broadcast range or a broadcast time window.

14. The method according to claim 10, wherein bases on which the source D2D UE determines that the broadcast request is successful comprise:
  receiving an acceptance response message sent by at least one destination D2D UE within the designated period of time; and
  if the acceptance response message is received, representing that the broadcast request is successful, and otherwise, representing that the broadcast request is unsuccessful.

15. The method according to claim 14, further comprising: when two or more source D2D UEs simultaneously send broadcast request messages and the messages conflict, making the request from only one or no source D2D UE succeed in a resource competition manner.

* * * * *